United States Patent [19]

Aoki

[11] Patent Number: 4,900,884
[45] Date of Patent: Feb. 13, 1990

[54] COMPOSITE COOKING SYSTEM HAVING MICROWAVE HEATING AND INDUCTION HEATING

[75] Inventor: Masayuki Aoki, Ichinomiya, Japan

[73] Assignee: Kabushiki Kaisha Toshiba, Kawasaki, Japan

[21] Appl. No.: 238,618

[22] Filed: Aug. 30, 1988

[30] Foreign Application Priority Data

| Nov. 28, 1987 | [JP] | Japan | 62-300417 |
| Nov. 28, 1987 | [JP] | Japan | 62-300418 |
| Nov. 28, 1987 | [JP] | Japan | 62-300419 |
| Nov. 30, 1987 | [JP] | Japan | 62-302662 |

[51] Int. Cl.$^4$ .......................... F24C 7/08; H05B 6/06; H05B 6/68; H05B 6/12
[52] U.S. Cl. .......................... 219/104.93; 219/10.55 B; 219/10.75; 219/10.77; 363/37
[58] Field of Search ......... 219/10.41, 10.493, 10.55 B, 219/10.55 R, 10.55 M, 10.75, 10.77; 364/188, 143, 144, 145, 477; 340/706; 363/21, 37; 361/93, 94

[56] References Cited

U.S. PATENT DOCUMENTS

| 4,002,875 | 1/1977 | Kiuchi et al. | 219/10.55 B |
| 4,356,371 | 10/1982 | Kiuchi et al. | 219/10.77 |
| 4,467,165 | 8/1984 | Kiuchi et al. | 219/10.77 |
| 4,517,431 | 5/1985 | Ueda | 219/10.55 B |
| 4,636,961 | 1/1987 | Bayer | 364/474 |
| 4,638,135 | 1/1987 | Aoki | 219/10.493 |
| 4,724,291 | 2/1968 | Inumada | 219/10.55 B |
| 4,740,672 | 4/1988 | Takei | 219/492 |
| 4,755,646 | 7/1988 | Fowler | 219/10.55 B |

FOREIGN PATENT DOCUMENTS 3445538 6/1985 Fed. Rep. of Germany .
3447865 2/1986 Fed. Rep. of Germany .
51-48285 12/1976 Japan .
53-24649 3/1978 Japan .
62-71190 4/1987 Japan .
2166916A 5/1986 United Kingdom .

OTHER PUBLICATIONS

Abstract of Japanese Kokai No. 52-112138, 9/20/77, Abstract Published 1/6/78.
Abstract of Japanese Kokai No. 58-300938, 11/22/83, Abstract Published 3/2/84.

*Primary Examiner*—Derek S. Jennings
*Assistant Examiner*—David Osborn
*Attorney, Agent, or Firm*—Cushman, Darby & Cushman

[57] ABSTRACT

An inverter rectifies an AC input to produce a DC output and switches the DC output so as to selectively obtain a high-frequency output for microwave or induction heating. A microwave heating unit is coupled to the inverter, receives the high-frequency output for microwave heating, and generates a first heating power of a microwave. An induction heating unit is coupled to the inverter, receives the high-frequency output for induction heating, and generates a second heating power of electromagnetic induction. An output setting unit selectively sets an output setting value for the first or second heating power. An input detector detects a current value of the AC input to the inverter. A controller compares the output setting value from the output setting section with the current value from the input detector, outputs a control signal representing the comparison result to the inverter so as to control the output from the inverter, and causes the microwave heating unit or induction heating unit to selectively generate the first or second heating power.

16 Claims, 10 Drawing Sheets

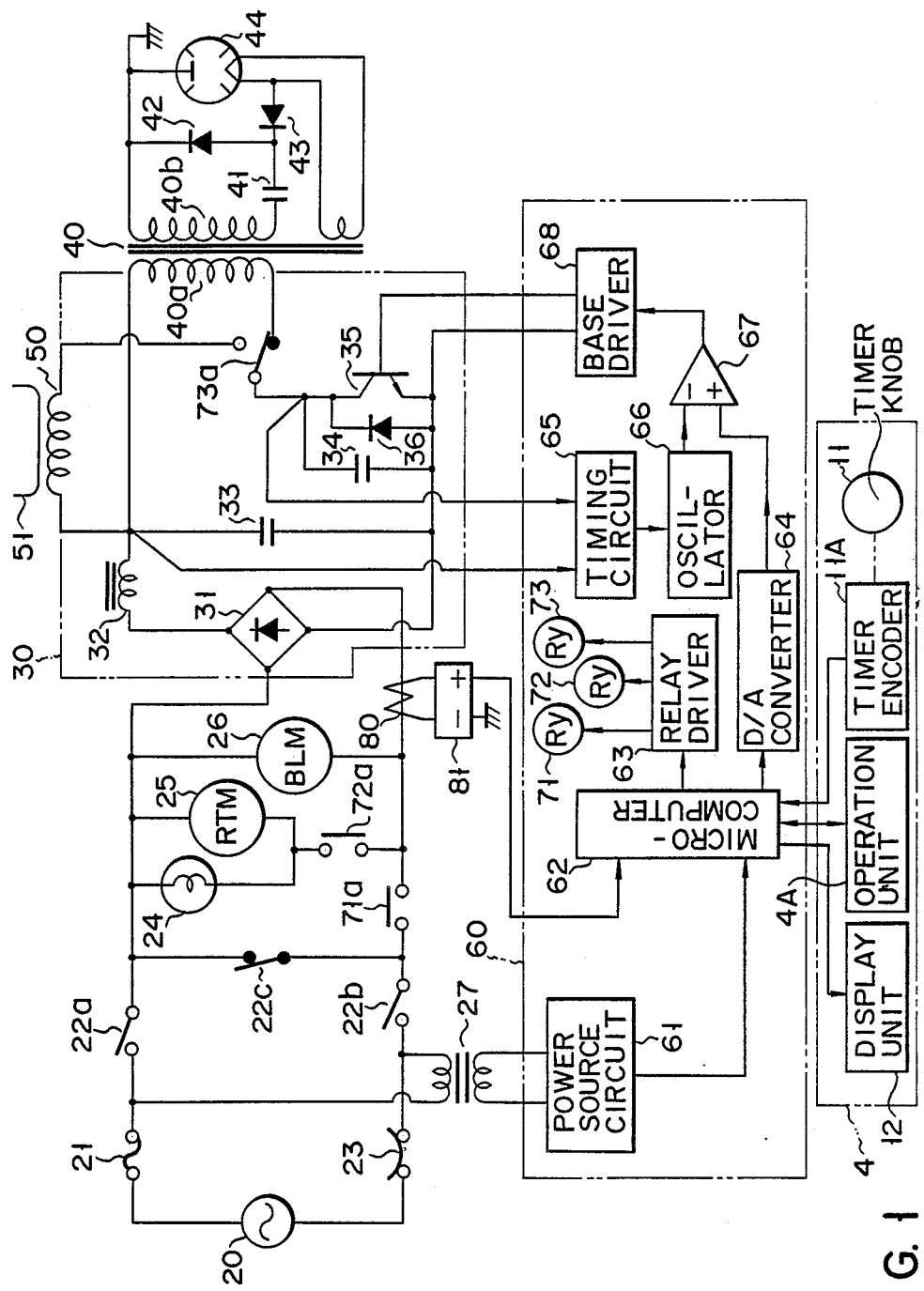
F I G. 1

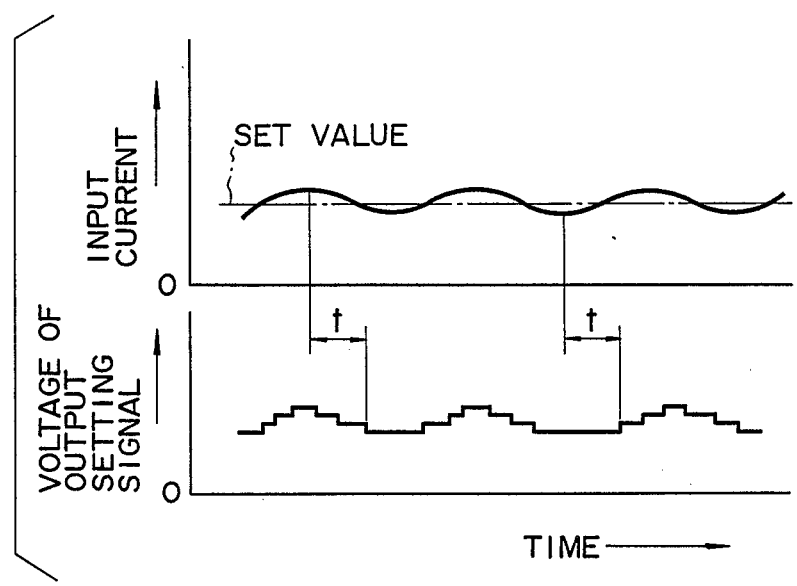
F I G. 4
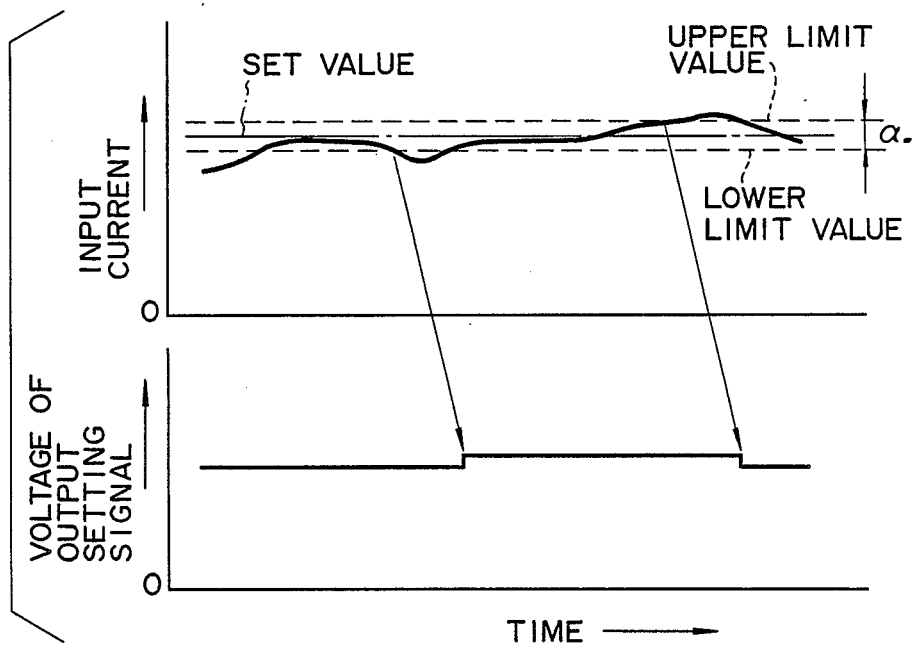
F I G. 5

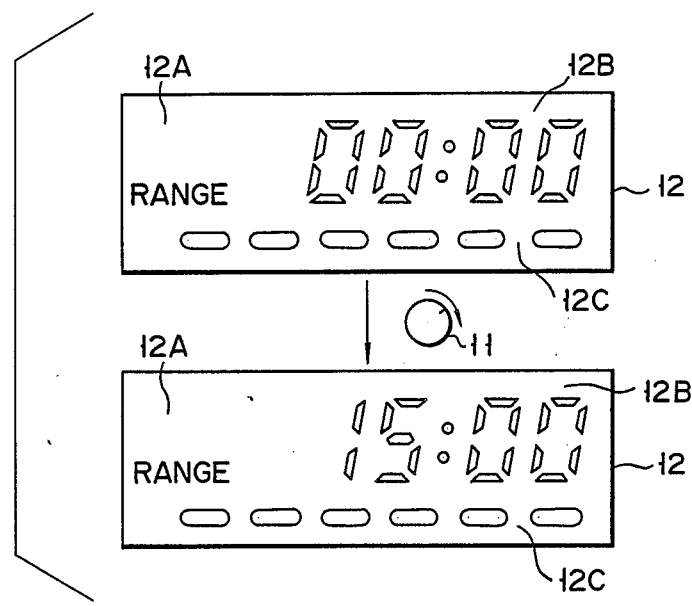
F I G. 12
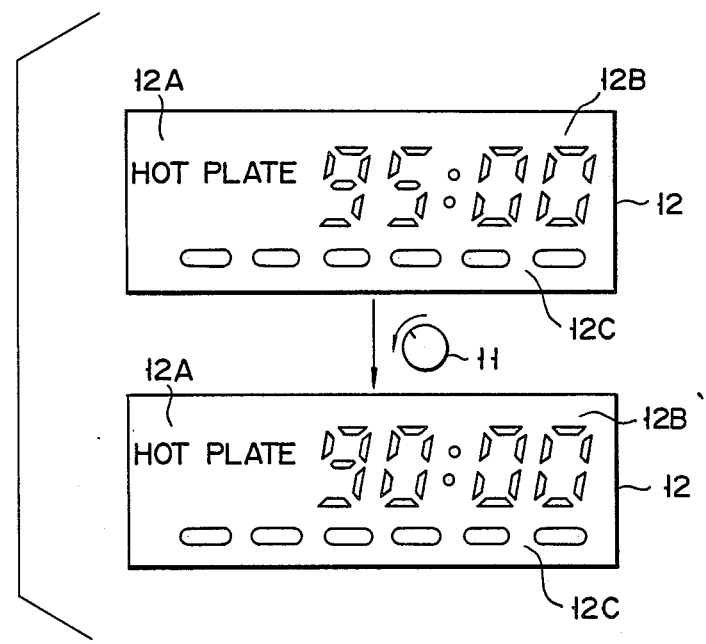
F I G. 13

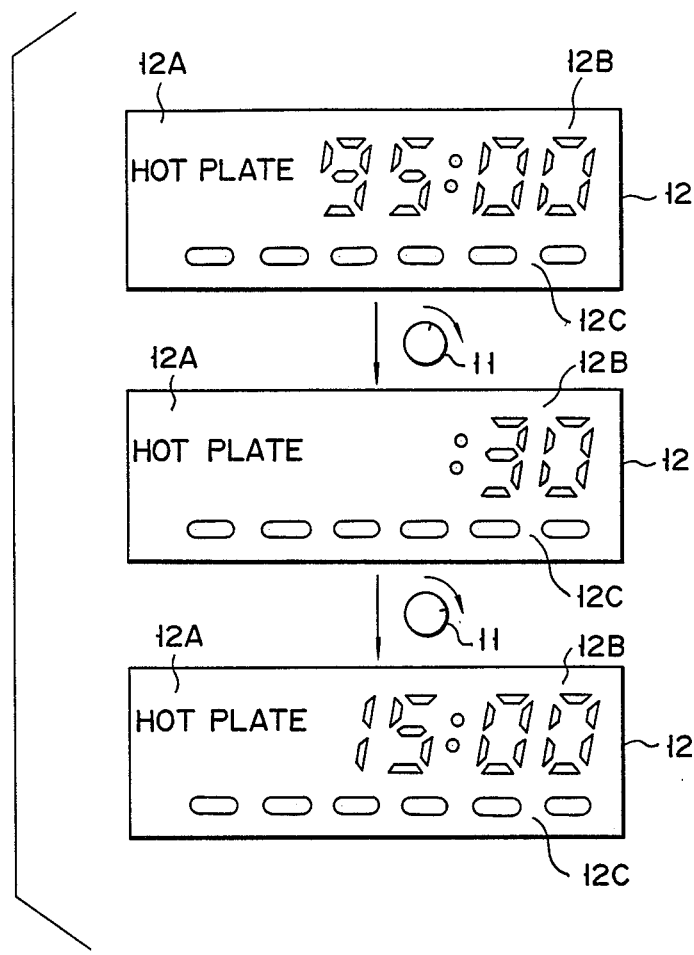
F I G. 14

COMPOSITE COOKING SYSTEM HAVING MICROWAVE HEATING AND INDUCTION HEATING

BACKGROUND OF THE INVENTION

1. Field of the Invention

This invention generally relates to a composite cooking system and, more particularly, to a composite cooking apparatus capable of performing microwave heating as an electronic range apparatus, electromagnetic induction heating as an electromagnetic cooking apparatus, and a method of controlling the same.

2. Description of the Related Art

A composite cooking system with an inverter circuit has been developed which is capable of performing microwave heating in an electronic range and electromagnetic induction heating in an electromagnetic cooking system.

In addition to the advantages of two heating functions, the composite cooking system can use a lightweight, compact high-voltage transformer as compared with that in the electronic range.

In such a composite cooking system, however, many problems are left unsolved.

In a composite cooking system, when output level control during microwave heating is not sufficient, output (power consumption) is decreased due to a change in temperature of a magnetron or the like, and optimal heating is often difficult.

A so-called standard cooking utensil such as a pot or a pan is used to control the output (power consumption) of electromagnetic induction heating during manufacturing. However, various types of cooking utensil are commercially available, and a higher output (power consumption) than that preset with the standard pan may be generated in practice. In this case, elements of an inverter circuit are overloaded to adversely affect the service life and cause operation failure.

In the above composite cooking system, a pan as a load must be discriminated to be an optimal load during induction heating. If the load as the pan is not appropriate, the operation of the inverter circuit must be immediately interrupted to assure safe operation.

A load detector may be arranged as in the conventional electromagnetic cooking system. However, a large number of components are required, resulting in a high cost. In addition, control of the load detector is difficult.

The conventional composite cooking system has a further problem. At the start of heating, output from the inverter circuit is increased to a preset level However, at the start of microwave heating, a heater of the magnetron is not sufficiently heated. Therefore, the anode voltage of the magnetron is increased, and stress (overvoltage) acts on the associated high-voltage diode and capacitor.

More specifically, at the start of microwave heating, the level of the output setting signal is increased to increase the output from the inverter circuit to the preset output. At this time, the anode voltage of the magnetron is greatly increased. It should be noted that an input current is a current input to the inverter circuit.

For the above reason, expensive components which can widthstand an overvoltage must be used as the high-voltage diode and capacitor, resulting in a high cost.

In such a composite cooking system, a common timer is generally used for controlling the cooking time, and a common operation knob for setting the cooking time is generally used.

The cooking time for microwave heating is relatively short, while that for induction heating is relatively long. Therefore, an operation for setting the cooking time for induction heating is cumbersome.

SUMMARY OF THE INVENTION

It is, therefore, an object of the present invention to provide a new and improved composite cooking system having a microwave heating function and an induction heating function, and which can stabilize output to allow optimal cooking and assure safe operation of elements in an inverter circuit, thereby improving reliability of the system.

It is another object of the present invention to provide a composite cooking system which can provide the effect of output stabilization as described above and which can assure safe operation during induction heating without increasing the cost or requiring difficult control.

It is still another object of the present invention to provide a composite cooking system which can provide the effect of output stabilization as described above and which can assure safe operation of high-voltage circuit elements without applying an overvoltage to the high-voltage circuit elements, thereby reducing the cost.

It is still another object of the present invention to provide a composite cooking system which can provide the effect of output stabilization as described above and which can easily and quickly set the cooking time regardless of the type of heating, i.e., microwave heating or induction heating.

According to one aspect of the present invention, there is provided a composite cooking apparatus having a microwave heating function and an induction heating function, the apparatus comprising:

inverter means for rectifying an AC input to obtain a DC output and switching the DC output so as to selectively obtain a high-frequency output for microwave or induction heating;

microwave heating means, coupled to the inverter means, for receiving the high-frequency output for microwave heating and generating a first heating power of a microwave;

induction heating means, coupled to the inverter means, for receiving the high-frequency output for induction heating and generating a second heating power by electromagnetic induction;

output setting means for setting an output setting value so as to selectively obtain the first or second heating power;

input detecting means for detecting a current value of the AC input to the inverter means; and control means for comparing the output setting value from the output setting means with the current value from the input detecting means and supplying a control signal to the inverter means in accordance with a comparison result, thereby controlling the output from the inverter means and causing the microwave heating means or the induction heating means to selectively generate the first or second heating power.

BRIEF DESCRIPTION OF THE DRAWINGS

These and other objects and features of the present invention can be understood through the following embodiments by reference to the accompanying drawings, in which:

FIG. 1 is a diagram showing an arrangement of a control a composite cooking system according to an embodiment of the present invention;

FIGS. 4 and 5 are views for explaining the first feature of the embodiment shown in FIG. 1;

FIGS. 12 to 14 are views showing display contents of the display unit as the fourth feature of the embodiment shown in FIG. 1.

DETAILED DESCRIPTION OF THE PREFERRED EMBODIMENTS

A few preferred embodiments of the present invention will be described with reference to the accompanying drawings.

Figure 2:
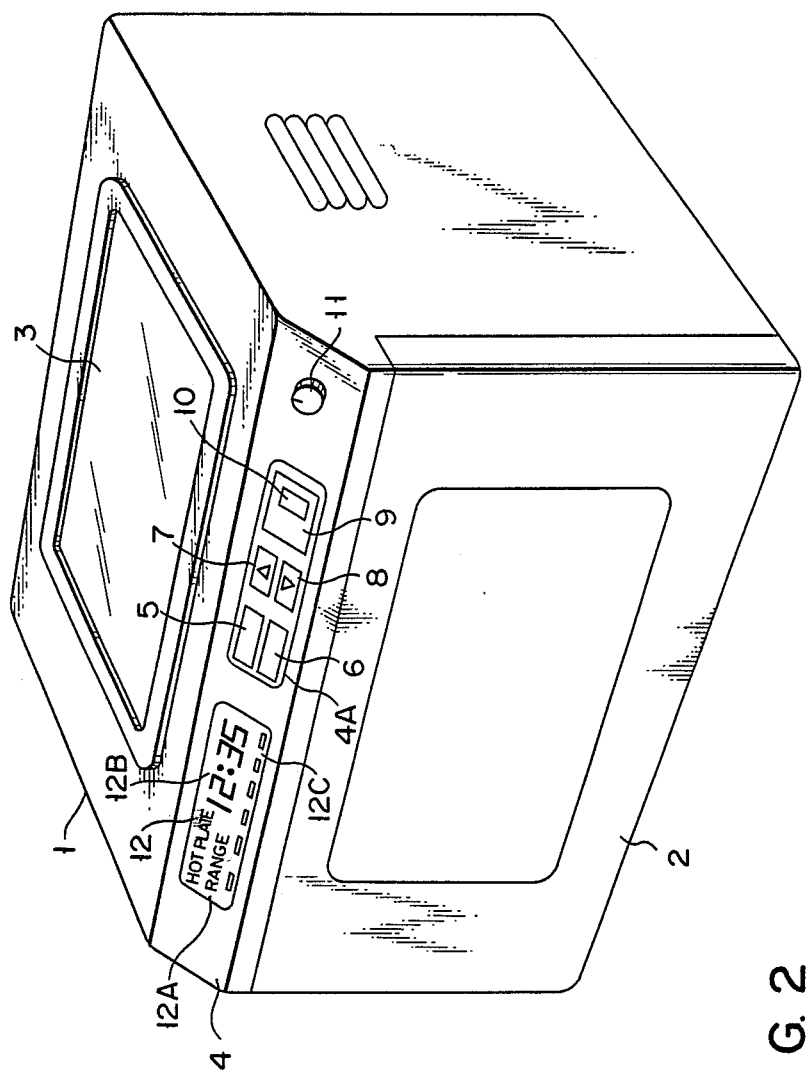
FIG. 2 is a perspective view showing an outer appearance of the cooking system shown in FIG. 1.

Referring to FIG. 2, reference numeral 1 denotes a composite cooking system housing. Door 2 is supported on the front surface of housing 1, and top plate 3 is mounted on the upper surface of housing 1.

A heating chamber (not shown) is defined in housing 1 inside door 2. A high-frequency wave generated by magnetron 44 (to be described later) is supplied to the heating chamber. In addition, a turntable not shown) for supporting food is arranged inside the heating chamber.

Heating coil 50 (to be described later) is arranged below the lower surface of top plate 3 in housing 1 so as to correspond to the position of top plate 3.

A corner portion defined by the front and upper surfaces of housing 1 serves as operation panel 4. Panel 4 is inclined to allow easy operation and improve readability of the display contents. Operation panel 4 includes operation unit 4A and display unit 12C. Operation unit 4A includes hot plate key 5 for setting induction heating, range key 6 for setting microwave heating, UP key 7 for setting an output, DOWN key 8 for setting an output, start key 9, and cancel key 10. Display unit 12 includes time setting knob (timer knob) 11 which can be endlessly rotated, cooking mode display section 12A, time display 12B, and set output display section 12C. A control circuit of the composite cooking system is shown in FIG. 1.

Referring to FIG. 1, reference numeral 20 denotes a commercial AC power source. Door monitor switch (short switch) 22c is connected to power source 20 through fuse 21, door switch 22a, door switch 22b, and magnetron thermal element 23.

Heating chamber illumination lamp (chamber lamp) 24 is connected to power source 20 through fuse 21, door switch 22a, relay contact 72a, main relay contact 71a, door switch 22b, and magnetron thermal element 23. Turntable drive motor 25 is connected in parallel with illumination lamp 24.

Magnetron cooling and heating coil cooling blower motor 26 is connected to power source 20 through fuse 21, door switch 22a, main relay contact 71a, door switch 22b, and magnetron thermal element 23.

Inverter circuit 30 is connected to power source 20 through fuse 21, door switch 22a, main relay contact 71a, door switch 22b, and magnetron thermal element 23.

Inverter circuit 30 includes a rectifier consisting of diode bridge 31, choke coil 32, and smoothing capacitor 33. The output terminal of the rectifier is connected to one terminal of primary coil 40a of high-voltage transformer 40 and one terminal of heating coil 50. The other terminal of primary coil 40a of high-voltage transformer 40 is connected to one terminal of resonance capacitor 34 through the normally closed side of relay contact (bidirectional contact) 73a. The other terminal of resonance capacitor 34 is connected to the other terminal of the rectifier. The other terminal of heating coil 50 is connected to one terminal of resonance capacitor 34 through the normally open side of relay contact 73a.

During nonenergization of relay contact 73a, primary coil 40a of high-voltage transformer 40 and resonance capacitor 34 constitute a series resonator. When relay contact 73a is operated, heating coil 50 and resonance capacitor 34 constitute a series resonator.

Resonance capacitor 34 is connected in parallel with a switching element, e.g., the collector-emitter path of npn-type power transistor 35, and damper diode (flywheel) 36. Power transistor 35 and damper diode 36 are arranged in one package.

Power transistor 35 causes the resonator to excite upon its ON/OFF operation, so that a high-frequency current is supplied to primary coil 40a of high-voltage transformer 40 or heating coil 50.

The anode-cathode path of magnetron 44 is connected to secondary coil 40b of high-voltage transformer 40 through a boosting rectifier consisting of capacitor 41 and high-voltage diodes 42 and 43. The anode of magnetron 44 is grounded, and the heater (i.e., the cathode) is connected to secondary coil 40c of high-voltage transformer 40.

The primary coil of step-down transformer 27 is connected to power source 20 through fuse 21 and magnetron thermal element 23. Controller 60 is connected to the secondary coil of transformer 27.

Controller 60 controls the overall operations of the composite cooking system. Controller 60 includes power source circuit 61, microcomputer 62 such as a TMP47C441AN-1544 (TOSHIBA) incorporating an A/D (analog-to-digital) converter, relay driver 63, D/A (digital-to-analog) converter 64, timing circuit 65, oscillator 66, comparator 67 as a pulse width modulation circuit (PWM circuit), and base driver 68.

Relay driver 63 drives main relay 71 and relays 72 and 73.

D/A converter 64 generates an output setting signal having a voltage level corresponding to an output setting command from microcomputer 62.

Timing circuit 65 receives a voltage from smoothing capacitor 33 in inverter circuit 30 and a collector voltage of power transistor 35 so as to minimize the switching loss of inverter circuit 30. Timing circuit 65 then determines the oscillation timing of oscillator 66.

Oscillator 66 generates a saw-toothed wave signal.

Comparator 67 PWM-modulates the saw-toothed wave signal from oscillator 66 in accordance with the output setting signal from D/A converter 64.

Base driver 68 turns on/off transistor 35 in inverter circuit 30 in response to an output from comparator 67.

Operation unit 4A, display unit 12, and timer encoder 11A in operation panel 4 are connected to microcomputer 62. Timer encoder 11A is disclosed in U.S. Pat. No. 4,740,672 filed by the present applicant. Timer encoder 11A generates pulses the number of which corresponds to an angular position of timer knob 11. Therefore, cooking time can be set such that timer knob 11 is rotated through a predetermined angle and microcomputer 62 fetches pulses output from timer encoder 11A.

Current transformer 80 is connected to the input line of inverter circuit 30. Transformer 80 constitutes an input current detecting means together with bridge rectifier 81. Bridge rectifier 81 rectifies an output from transformer 80. An output from bridge rectifier 81 is supplied to microcomputer 62.

Figure 3:
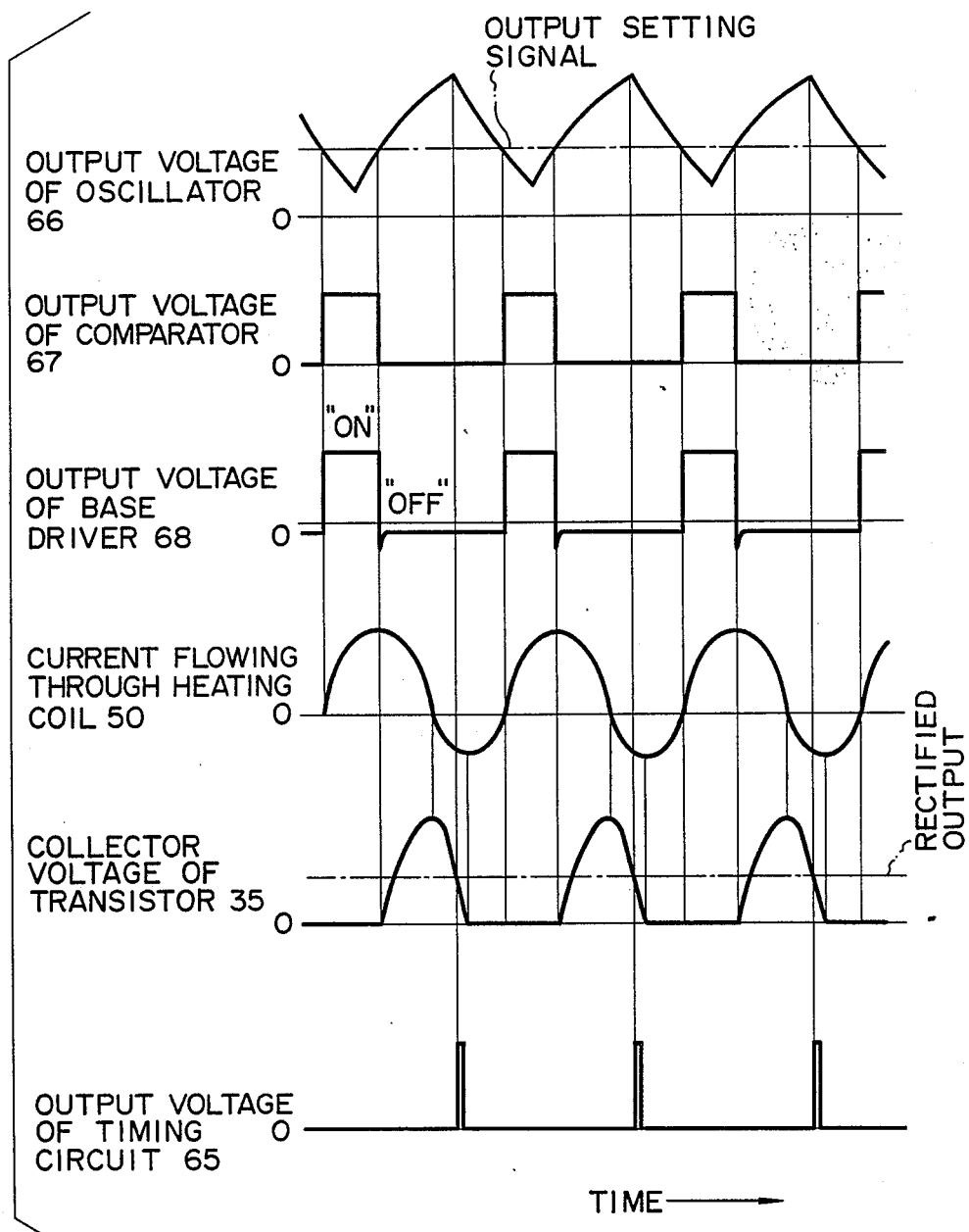
FIG. 3 is a chart showing voltage waveforms of the components in FIG. 1.

An operation of the circuit arrangement described above will be described with reference to FIG. 3.

In order to cook food by induction heating, pan 51 is placed on top plate 3 and hot plate key 5 in operation panel 4 is depressed. In addition, a desired cooking time is set with time setting knob 11. UP or DOWN key 7 or 8 is used to set a desired heating power.

In this case, letters "HOT PLATE" are displayed on mode display section 12A of display unit 12. At the same time, the set cooking time is digitally displayed on time display section 12B. A light-emitting diode located at a position corresponding to the set output power in display section 12C is turned on.

When start key 9 is depressed, microcomputer 62 actuates relays 71 and 73. When relay 71 is operated, contact 71a is set to be ON, so that a power supply path to inverter circuit 30 and blower motor 26 is established. When relay 73 is operated, the normally open side of contact 73a is closed, and heating coil 50 is selected.

Microcomputer 62 generates an output setting command based on the set output. This output setting command is converted into an analog output setting signal by D/A converter 64. The analog signal is then supplied to comparator 67.

The saw-toothed wave signal is output from oscillator 66 and is PWM-converted by comparator 67.

More specifically, if the voltage of the output setting signal is higher than that of the saw-toothed wave signal, an output voltage of comparator 67 is set at high level. However, if the voltage of the output setting signal is lower than that of the saw-toothed wave signal, the output voltage of comparator 67 is set at a low level.

An output from comparator 67 is amplified by base driver 68, and an amplified signal is applied to the base-emitter path of power transistor 35.

When power transistor 35 is turned on, a current is supplied to heating coil 50 through the collector-emitter path of power transistor 35. When power transistor 35 is turned off, the current which has flowed to heating coil 50 is used to charge resonance capacitor 34. In this state, a current flows from resonance capacitor 34 to heating coil 50.

Upon ON/OFF operation of power transistor 35, a high-frequency current flows in heating coil 50, and heating coil 50 generates a high-frequency magnetic field. This field is applied to pan 51 through top plate 3, and an eddy current is generated in pan 51. When the eddy current is generated, pan 51 is self-heated by an eddy current loss, thereby heating food therein. That is, cooking by induction heating is started.

Timing circuit 65 generates a trigger pulse at an intersection between the voltage (i.e., the rectified voltage) from smoothing capacitor 33 and the collector voltage of power transistor 35. This trigger pulse is applied to oscillator 66. Power transistor 35 is turned on while its collector voltage is low, thereby minimizing the switching loss of transistor 35.

When the set cooking time has elapsed, microcomputer 62 interrupts the operations of relays 71 and 73. When the operation of relay 71 is interrupted, contact 71a is set to be OFF, and a power supply path to inverter circuit 30 is blocked. That is, cooking by induction heating is ended.

In order to cook food by microwave heating, food is placed on the turntable in the heating chamber and door 2 is closed. Range key 6 in operation unit 4A is depressed. A desired cooking time is set with time setting knob 11, and UP or DOWN key 7 or 8 is used to set a desired output power.

In this case, letters "RANGE" are displayed on mode display section 12A of display unit 12, and the set cooking time is digitally displayed on time display section 12B. A light-emitting diode at a position corresponding to the set output in set output display section 12C is turned on.

When start key 9 is depressed, microcomputer 62 actuates relays 71 and 72.

When relays 71 and 72 are operated, contacts 71a and 72a are set to be ON, and a power supply path to inverter circuit 30, heating chamber illumination lamp 24, turntable drive motor 25, and blower motor 26 is established.

In this case, relay 73 is not operated, and therefore the normally closed side of contact 73a is kept closed and primary coil 40a of high-voltage transformer 40 is selected.

Inverter circuit 30 is operated in the same manner as in induction heating, and a high-frequency current flows in primary coil 40a of high-voltage transformer 40. A voltage induced by second coil 40b of high-voltage transformer 40 is boosted and rectified, and the resultant voltage is applied to magnetron 44. Magnetron 44 is then oscillated. In this state, a high-frequency wave is supplied to the heating chamber to start cooking by microwave heating.

When the set cooking time has elapsed, microcomputer 62 interrupts the operations of relays 71 and 72. When the operation of relay 71 is stopped, contact 71a is set to be OFF, and the power supply path to inverter circuit 30 is blocked. That is, cooking by microwave heating is ended.

During the operation of inverter circuit 30, an input current to inverter circuit 30 is detected by current transformer 80. A DC voltage having a level corresponding to the detected current is supplied from bridge rectifier 81 to microcomputer 62.

Microcomputer 62 calculates an average or RMS value of the input current of inverter circuit 30 in accordance with the output from bridge rectifier 81. When the calculated value is smaller than the set value (corresponding to the output setting signal), the level of the output setting signal is increased to prolong the ON period of power transistor 35. However, when the calculated value is larger than the set value, the level of the output setting signal is lowered to shorten the ON period of power transistor 35.

When the ON period of power transistor 35 is prolonged, the high-frequency current supplied to heating coil 50 or primary coil 40a of high-voltage transformer 40 is increased, and the output is increased. However, when the ON period is shortened, the high-frequency current flowing in heating coil 50 or primary coil 40a of high-voltage transformer 40 is decreased, and therefore the output is decreased.

During induction heating, even if pan 51 is not a standard pan, the preset output can be kept constant. In this case, the elements of inverter circuit 30 are not overloaded, and the service life of the elements can be prolonged. In addition, optimal heating can be performed, thereby improving reliability of the composite cooking system.

During microwave heating, the output can be maintained to be the set output regardless of a change in temperature of magnetron 44, thereby performing optimal heating.

Several features of the above embodiment will be described below.

A time lag is generally present due to a processing speed of microcomputer 62 in the above-mentioned operations. As shown in FIG. 4, time lag t occurs between a change in input current and a change in voltage of the corresponding output setting signal. If the output is controlled in accordance with only the magnitude of the input current with respect to the set value, variations in output may be increased.

In order to prevent this, in this embodiment, a predetermined width $\alpha$ (difference) is determined between upper and lower limit values by using the set value (corresponding to the output setting signal) as the center, as shown in FIG. 5. The upper and lower limit values are given as a true set range of the input current. When the calculated value of the input current is smaller than the lower limit value, microcomputer 62 increases the level of the output setting signal. However, when the calculated value is larger than the upper limit value, the level of the output setting signal is lowered.

When the set range having predetermined width $\alpha$ between the upper and lower limit values is used, output variations can be reduced even if the time lag is present in the processing speed of microcomputer 62. Therefore, the increase in variation described above can be prevented.

Since the output setting signal is a D/A-converted signal, its levels are discrete. If the width $\alpha$ between the upper and lower limit values is smaller than a discrete change in output corresponding to one level change (one output step) of the output setting signal, the following problem occurs. When the calculated value of the input current is smaller than the lower limit value and the level of the output setting signal is increased, the calculated value of the input current immediately exceeds the upper limit value. Therefore, the level of the output setting signal must be immediately lowered, resulting in inconvenience. That is, employment of the upper and lower values becomes of no use.

Therefore width $\alpha$ between the upper and lower limit values is set to be larger than a minimum output control width which can be controlled by microcomputer 62, thus preventing the above drawback. That is, an actual change in output corresponding to one level change (or one step) of the output setting signal does not exceed width $\alpha$ between the upper and lower limit values.

Since relay contact 73a of heating coil 50 is connected to the normally open side, disconnection of the coil of relay 73 allows immediate interruption of power supplied to heating coil 50, thereby assuring safe operation.

During the inductive heating described above, microcomputer 62 compares the calculated value (the average or RMS value of the input current) obtained on the basis of an output from bridge rectifier 81 with load detection set value Vs to determine whether or not the load is appropriate.

Figure 6:
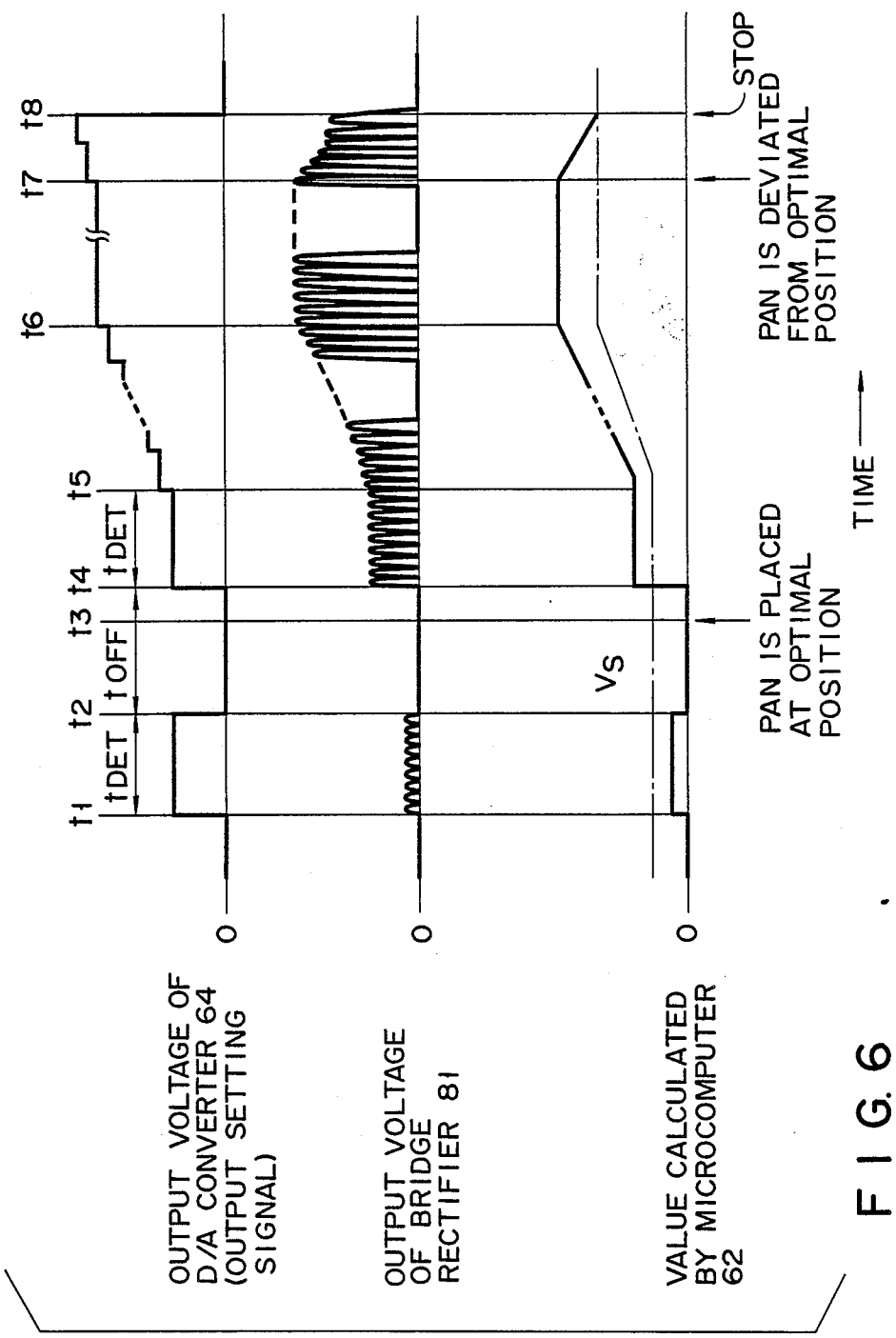
FIGS. 6 to 9 are views for explaining the second feature of the embodiment shown in FIG. 1.
Figure 8:
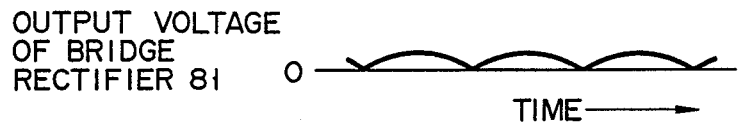
Figure 9:
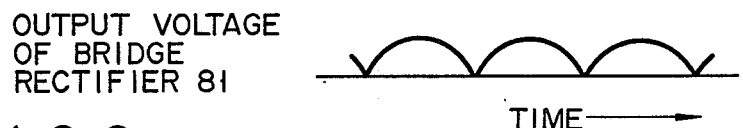

As shown in FIG. 6, a low output operation is performed formed for time interval tdet between time t1 and time t2 upon depression of start key 9. At this time, if pan 51 is not present on top plate 3, an input current to inverter circuit 30 is small. An output voltage of bridge rectifier 81 is set at low level, as shown in FIG. 8. If an improper aluminum pan is placed on top plate 3 or a metallic piece such as a fork or a knife is placed on top plate 3, an input current to inverter circuit 30 is also small, and the output voltage of bridge rectifier 81 is set at low level, as shown in FIG. 9.

Microcomputer 62 has load detection set value Vs, and value Vs is initially kept at low level. The calculated value of the input current is compared with set value Vs at time t2. If the calculated value is smaller than set value Vs, microcomputer 62 determines that the load is improper.

For a time interval between time t4 and time t5 after time interval toff, the low output operation is repeated to detect the load for time interval $t_{det}$. This low output level is determined to be a value which does not heat a metallic piece such as a fork or a knife.

Figure 7:
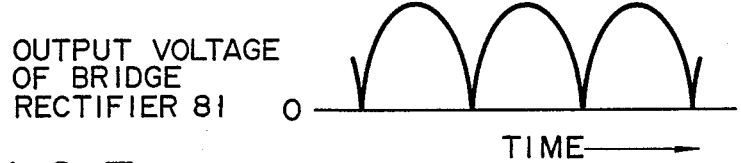

Assume that a proper pan is placed on top plate 3 at time t3 between time t2 and time t4. An input current to inverter circuit 30 is increased in correspondence with the low output operation at time t2. The output voltage of bridge rectifier 81 is set at high level, as shown in FIG. 7.

When the calculated value exceeds set value Vs at time t5, microcomputer 62 gradually increases the level of the output setting signal to a target value corresponding to the set output, and substantial microwave heating is started. Time $t_{off}$, which is the OFF time, is set to be about 1.5 to 2 seconds so that the user does not defect an abnormality. A ratio of time $t_{off}$ to time $t_{det}$ is determined so as not to heat a metallic piece such as a fork or a knife.

At the start of heating, an input current to inverter circuit 30 is increased with an increase in output. At this time, microcomputer 62 increases set value Vs with an increase in calculated value. When the actual output reaches the set output and is stabilized (time t6), this set value Vs is kept constant.

When the user deviates the pan from the initial position on top plate 3 at time t7, an input current to inverter circuit 30 is decreased.

When the input current is small (when the calculated value is small), microcomputer 62 starts its initial output control so as to increase the level of the output setting signal. This operation, however, is to forcibly increase the output in a substantially no-load state. The stress (overvoltage) acts on lower transistor 35 in inverter circuit 30.

In this case, since set value Vs is kept to be a higher value, the calculated value becomes immediately smaller than set value Vs when the input current is decreased. When the calculated value becomes smaller than set value Vs, microcomputer 62 determines that the load is improper. The operation of inverter circuit 30 is immediately interrupted. Therefore, the stress does not act on transistor 35.

Assume that pot 51 is not present on top plate 3, that a metallic piece such as a fork or a knife is placed on top plate 3, or that an improper aluminum pan is placed on top plate 3. In this case, microcomputer 62 automatically detects this and interrupts induction heating. Therefore, the elements of inverter circuit 30 are not overloaded and are safe. In addition, unnecessary heating of a fork, a knife or an empty can may be prevented, and the user will not be hurt by excessive heat.

Microcomputer 62 for controlling the overall operations of the composite cooking system determines whether the load is proper. Elements for detecting the load are constituted only by current transformer 80 and bridge rectifier 81, and therefore, the number of components can be small, resulting in a low cost. In addition, difficult adjustment is not required.

Current transformer 80 and bridge rectifier 81, which serve as an input detecting means for output control, are used as the means for detecting the load, thus resulting in low cost.

Set value Vs for load detection is increased with an increase in input current upon heating, and the operation of inverter circuit 30 is interrupted upon movement of pan 51 on top plate 3. Therefore, the stress does not act on power transistor 35 in inverter circuit 30, and breakdown of power transistor 35 can be prevented in advance.

Figure 10:
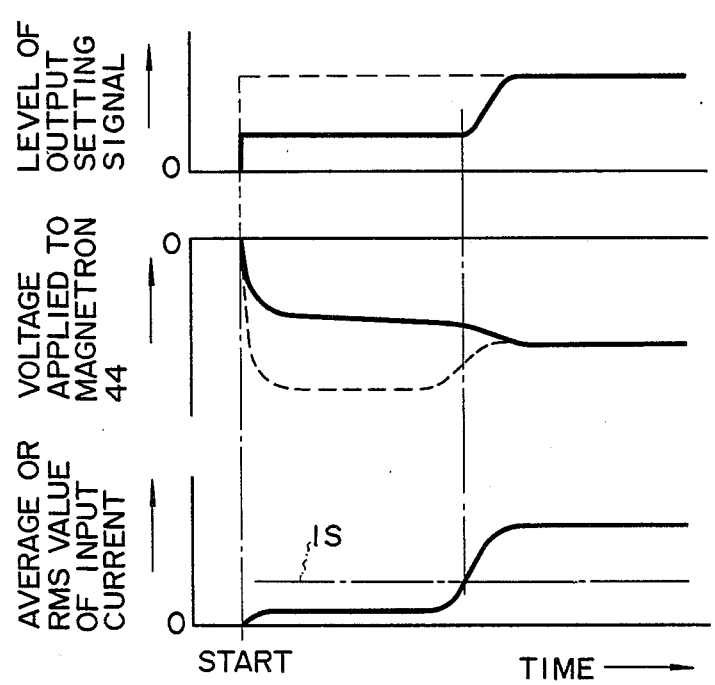
FIG. 10 is a view for explaining the third feature of the embodiment shown in FIG. 1.

At the start of microwave heating described above, the level of the output setting signal is kept to be a predetermined value or at a lower value by microcomputer 62 until the calculated value exceeds predetermined value Is, as indicated by a solid line in FIG. 10.

With this level control, in the initial state of magnetron 44, in which the heater is not sufficiently heated, the level of the output setting signal can be kept low and an anode voltage of magnetron 44 is not abruptly increased, as indicated by a broken line.

An overvoltage is not applied to high-voltage capacitor 41 and high-voltage diodes 42 and 43, and the service life of the high-voltage circuit elements can be prolonged. In other words, expensive high-voltage circuit elements which can withstand an overvoltage need not be used, resulting in low cost.

In this case, when the heater of magnetron 44 is sufficiently heated, an anode current starts to flow therethrough. When the anode current flows through magnetron 44, the application voltage is kept constant due to the characteristics of the magnetron. During this period, the calculated value exceeds the predetermined value, and level control for the output setting signal is canceled accordingly.

This level control is performed with reference to the input current and is not adversely affected by "variations" in heater characteristics of magnetron 44. Therefore, optimal control can be performed. In addition, output control current transformer 80 and bridge rectifier 81 are used to detect the load, thus obtaining an economical advantage.

Figure 11:
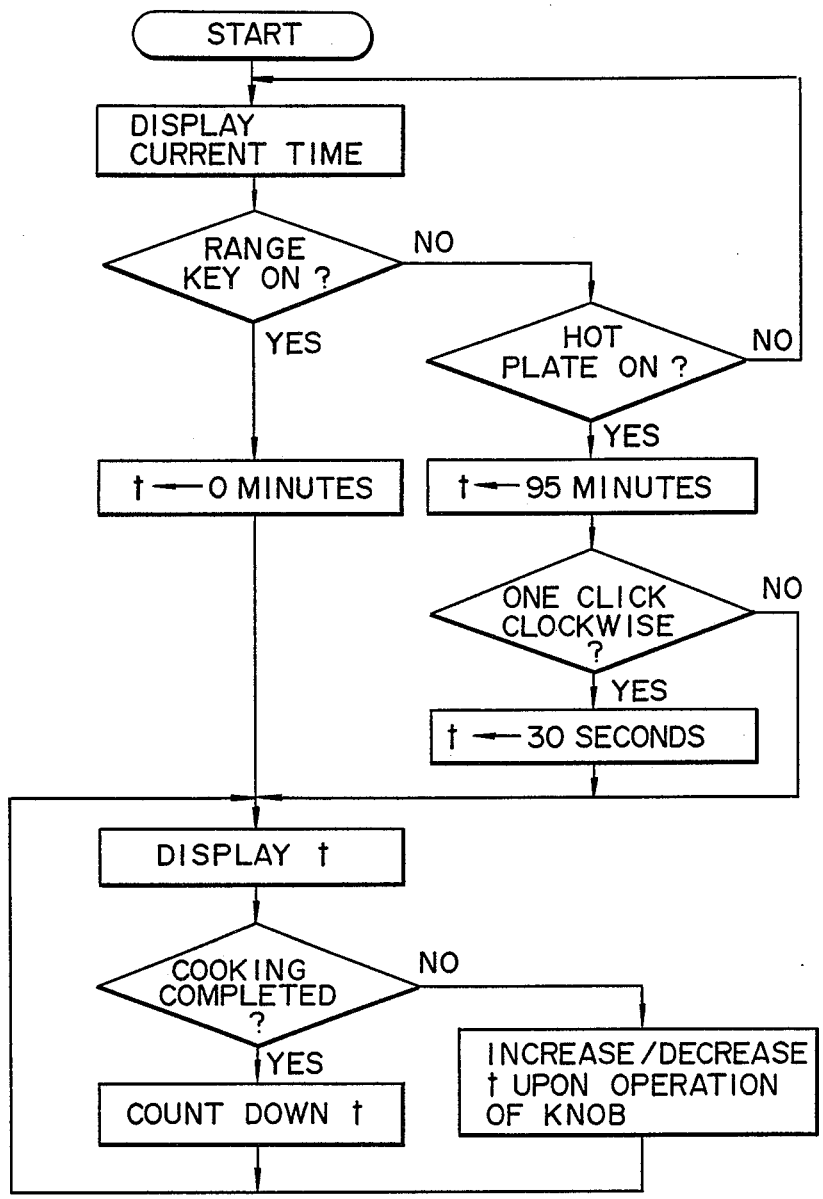
FIG. 11 is a flow chart for explaining the fourth feature of the embodiment shown in FIG. 1.

Cooking time setting control shown in FIG. 11 is performed by microcomputer 62 in either cooking mode.

During non-cooking time, current time is displayed on display unit 12.

When microwave heating is set upon depression of range key 6, cooking time t is initially set to be "zero minutes".

In this state, as shown in FIG. 12, time setting knob 11 is rotated clockwise (i.e., in a direction for increasing the setting time), and set cooling time t is increased. Thereafter, when time setting knob 11 is rotated counterclockwise (i.e., in a direction for decreasing the setting time), set cooking time t is shortened. Note that time setting knob 11 may be endlessly rotated in either direction.

When induction heating is set upon depression of hot plate key 7, cooking time t is initially set to be a "maximum value", .e.g., "95 minutes".

In this state, as shown in FIG. 13, when time setting knob 11 is rotated counterclockwise, set cooking time t is decreased. However, when time setting knob 11 is rotated clockwise, time t is prolonged.

As shown in FIG. 14, if set cooking time t is set to be the maximum value (initial setting value), i.e., "95 minutes" and when time setting knob 11 is clicked one step clockwise, set cooking time t is reset to be "zero minutes". Thereafter, set cooking time t can be increased to be "30 seconds", "15 minutes", . . . upon clockwise rotation of time setting knob 11.

Display unit 12 sequentially displays set cooking times t regardless of the type of heating. The displayed time is counted down when cooking progresses.

When microwave heating is set, i.e., when the cooking time is relatively short, the cooking time is initially set to be "zero minutes". A desired cooking time can be easily and quickly set.

In addition, in order to set induction heating, i.e., in order to set a relatively long cooking time, the initial cooking time is set to be the "maximum value". Therefore, a desired cooking time can be easily and quickly set, and time setting knob 11 can be rotated through a small angle.

In particular, during setting of induction heating, the set cooking time is initially set to be the "maximum for time interval tdet between time t1 and time value" and reset to be "zero minutes" upon clockwise for time interval tdet between time t1 and time rotation of time setting knob 11. When cooking, for example, scrambled eggs, which suitably employs induction heating, the above time setting control is convenient.

Since operation panel 4 is inclined, time setting knob 11 can be easily operated and operation errors can be minimized.

In the above embodiment, the "maximum value " of the set cooling time is given as "95 minutes". However, the maximum value is not limited to a specific value, but can be arbitrarily determined.

Figure 15:
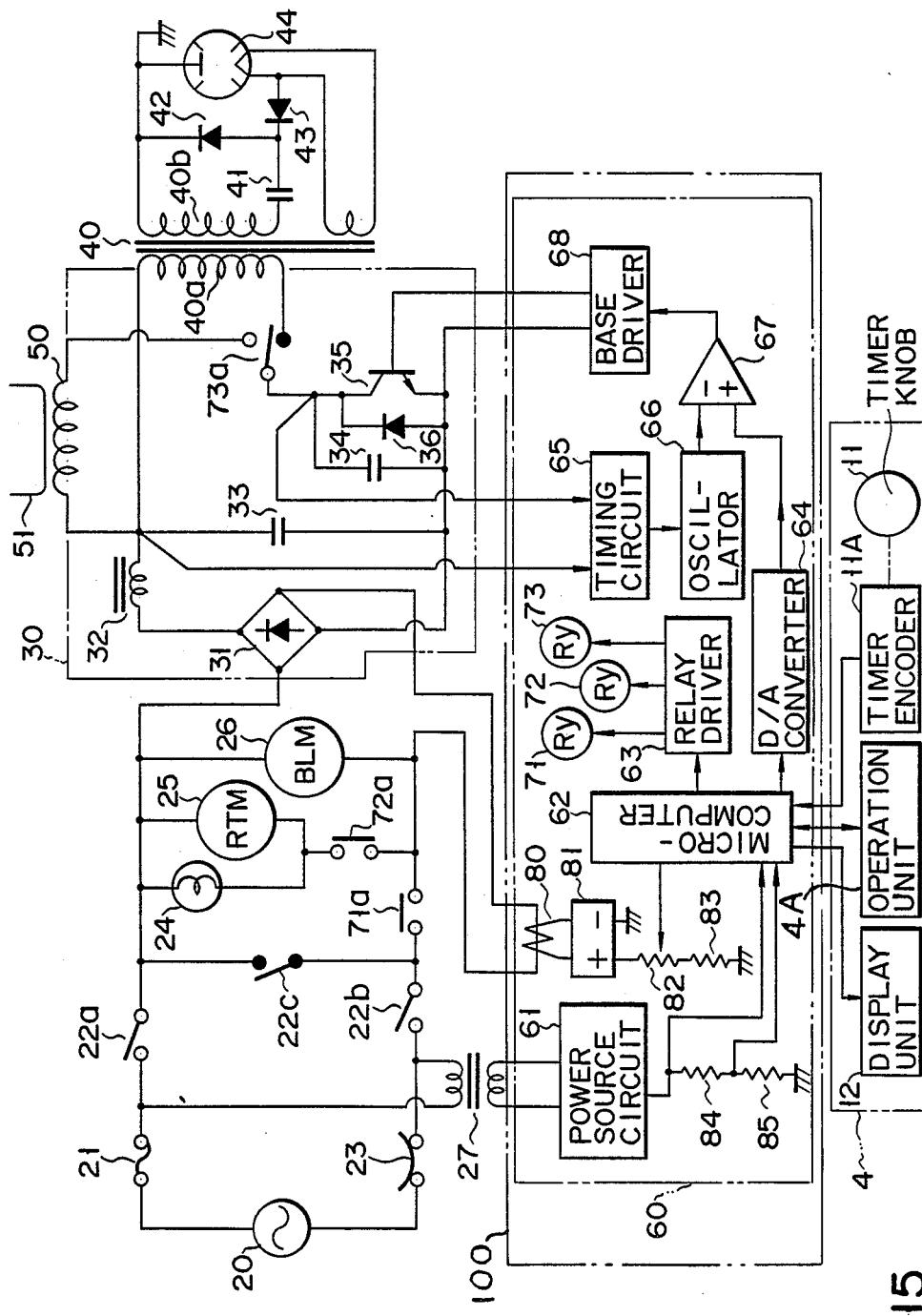
FIG. 15 is a diagram showing a control circuit of a composite cooking system according to another embodiment of the present invention.

Current transformer 80 and bridge rectifier 81 which serve as an input current detecting means are separated from controller 60 in the above embodiment. However, current transformer 80 and bridge rectifier 81 may be formed on a single circuit board 100 having controller 60 with microcomputer 62 thereon, in a second embodiment shown in FIG. 15. In this case, precision of input current detection can be improved, the number of components can be reduced, and adjustment can be simplified.

Current transformer 80 and bridge rectifier 81 are formed on the circuit board having controller 60 thereon. The positive output terminal of bridge rectifier 81 is grounded through a series circuit consisting of adjustment semi-fixed resistor (slide resistor) 82 and resistor 83. A slide terminal voltage of semi-fixed resistor 82 is input to microcomputer 62 as an input current detection signal.

The output terminal of power source circuit 61 is grounded through a series circuit consisting of resistors 84 and 85. A voltage appearing at the connecting point between resistors 84 and 85 is input to microcomputer 62 as an input current recognition reference voltage.

When "variations" in quality of current transformer 80 and bridge rectifier 81 are present, they appear as "variations" in input current detection signal. When "variations" in resistances of resistors 84 and 85 are present, they appear as "variations" in reference voltage. These "variations" appear as input current recognition errors. It is therefore difficult to perform optimal control.

By adjusting semi-fixed resistor 82 during the manufacturing process, "variations" in input current detection signal can be compensated. In addition, since the input current detection signal is the same bias voltage as the reference voltage, "variation" correction of the input current detection signal on the basis of adjustment of semi-fixed resistor 82 allows "variation" correction of the reference voltage.

Therefore, high-precision input current recognition can be performed in microcomputer 62, thereby always achieving optimal output control.

In particular, when current transformer 80 and bridge rectifier 81 are separated from controller 60, as shown in FIG. 1, both the input current detection signal regulator and the reference voltage regulator are required. However, in the second embodiment, only semifixed resistor 82 is required. Therefore, the number of components can be reduced, adjustment can be simplified, and economical advantage can be obtained.

If another circuit board having the same bias (e.g., a connecting relationship) as that of the circuit board of controller 60 is used, current transformer 80 and bridge rectifier 81 may be formed on the former circuit board.

The present invention is not limited to the particular embodiments described above. Various changes and modifications may be made within the spirit and scope of the invention.

According to the present invention as has been described above, there are provided the means for controlling the output from the inverter circuit in accordance with the output setting signal, the means for detecting the input current to the inverter circuit, and microcomputer for controlling the level of the output setting signal upon comparison of the detection current and the set value. When the input current to the inverter circuit is smaller than the set value, the microcomputer increases the output from the inverter circuit. However, when the input current to the inverter circuit is larger than the set value, the microcomputer decreases the output from the inverter circuit. According to the present invention, therefore, there is provided a highly reliable composite cooking system wherein the output can be stabilized to allow optimal cooking and the safe operation of the elements of the inverter circuit can be assured.

According to the present invention as has been described above, there are provided the means for detecting the input current to the inverter circuit, the means for determining whether the load is proper upon comparison between the detection current and the set value in the induction heating mode, and the means for interrupting the operation of the inverter circuit when the determined result indicates that the load is improper. With this arrangement, when the input current to the inverter circuit is smaller than the set value during induction heating, the load is determined to be improper, and the operation of the inverter circuit is interrupted. According to the present invention, therefore, there is provided a highly reliable composite cooking system wherein sufficiently safe operations can be assured during induction heating without increasing the cost or requiring difficult adjustment.

The present invention is not limited to the composite cooking system having microwave and induction heating functions. The present invention is applicable to a general electromagnetic cooking system employing only induction heating.

According to the present invention as has been described above, there are provided the means for controlling the output from the inverter circuit in accordance with the output setting signal, the means for detecting the input current to the inverter circuit, the means for controlling the level of the output setting signal in accordance with the detection current, and the means for suppressing the level of the output setting signal to a predetermined value or a lower value until the detection current exceeds the given value in the initial operation of microwave heating. During this initial operation, the level of the output setting signal can be kept to be the predetermined value or at the lower value until the input current to the inverter circuit exceeds the given value. According to the present invention, therefore, there is provided a composite cooking system wherein overvoltage is not applied to the high-voltage circuit elements, thereby sufficiently assuring the safe operation of the high-voltage circuit elements at low cost.

According to the present invention as has been described above, there are provided the means for initially setting the cooking time to be "zero" at the time of setting of microwave heating, the means for initially setting the cooking time to be the "maximum value" at the time of setting of induction heating, the time setting knob whose operation range is endless, and the means for increasing or decreasing the set cooking time in accordance with the operation of the time setting knob. In the case of microwave heating, i.e., when the cooking time is relatively short, the cooking time is initially set to be "zero". In the case of induction heating, i.e., when the cooking time is often long, the cooking time is initially set to be the "maximum value". According to the present invention, therefore, there is provided a composite cooking system providing excellent operability which allows easy and quick cooking setting regardless of the type of heating, i.e., microwave heating or induction heating.

What is claimed is:

1. A composite cooking apparatus having a microwave heating function and an induction heating function, said apparatus comprising:

inverter means for rectifying an AC input to obtain a DC output and switching the DC output so as to obtain selectively a high-frequency output for microwave or induction heating;

microwave heating means, coupled to said inverter means, for receiving the high-frequency output for microwave heating and generating a first heating power of a microwave;

induction heating means, coupled to said inverter means, for receiving the high-frequency output for induction heating and generating a second heating power by electromagnetic induction;

output setting means for setting an output setting value so as to obtain selectively the first or second heating power, the output setting value including upper and lower limit values having a predetermined width;

input detecting means for detecting a current value of the AC input to said inverter means;

control means for comparing the output setting value from said output setting means with the current value from said input detecting means and supplying a control signal to said inverter means in accordance with a comparison result, thereby controlling the output from said inverter means and causing said microwave heating means or said induction heating means to generate selectively the first or second heating power; and wherein the width between the upper and lower limit values is larger than a minimum control width of level control of a microcomputer used in said control means, the predetermined width of the output setting value preventing variations in the control signal due to a time lag between a change in the current value and a corresponding change in the output setting value.

2. An apparatus according to claim 1, wherein said input detecting means is formed on a circuit board having said microcomputer thereon or a circuit board having a bias equal to that of said circuit board having said microcomputer.

3. An apparatus according to claim 2, wherein said input detecting means comprises a current transformer for receiving the AC input and a rectifier for rectifying an output from said current transformer.

4. A composite cooking apparatus having a microwave heating function and an induction heating function, said apparatus comprising:

inverter means for rectifying an AC input to obtain a DC output and switching the DC output so as to selectively obtain a high-frequency output for microwave or induction heating;

microwave heating means, coupled to said inverter means, for receiving the high-frequency output for microwave heating and generating a first heating power of a microwave;

induction heating means, coupled to said inverter means, for receiving the high-frequency output for induction heating and generating a second heating power by electromagnetic induction;

output setting means for setting an output setting value so as to selectively obtain the first or second heating power;

input detecting means for detecting a current value of the AC input to said inverter means;

load detection setting means for setting a load detection setting value when the output setting value for obtaining the second heating power is set by said output setting means; and control means for:

comparing the output setting value from said output setting means with the current value from said input detecting means and supplying a control signal to said inverter means in accordance with a comparison result, thereby controlling the output from said inverter means and causing said microwave heating means or said induction heating means to selectively generate the first or second heating power, comparing the load detection setting value from the load detection setting means with the current value from said input detecting means, determining whether the load of said induction heating means is proper in accordance with a comparison result, and supplying an operation interruption signal to said inverter means when the determination result represents that the load is improper.

5. An apparatus according to claim 4, wherein the load detection setting value is increased with an increase in detection current upon initiation of induction heating.

6. An apparatus according to claim 4, wherein said inverter means comprises a relay contact for switching between microwave heating and induction heating, a primary coil of a high-voltage transformer used in said microwave heating means being connected to a normally closed side of said relay contact, and a heating coil used in said induction heating means being connected to a normally open side of said relay contact.

7. A composite cooking apparatus having a microwave heating function and an induction heating function, said apparatus comprising:

inverter means for rectifying an AC input to obtain a DC output and switching the DC output so as to obtain selectively a high-frequency output for microwave or induction heating;

microwave heating means, coupled to said inverter means, for receiving the high-frequency output for microwave heating and generating a first heating power of a microwave;

induction heating means, coupled to said inverter means, for receiving the high-frequency output for induction heating and generating a second heating power by electromagnetic induction;

output setting means for setting an output setting value so as to obtain selectively the first or second heating power, the output setting value including upper and lower limit values having a predetermined width;

input detecting means for detecting a current value of the AC input to said inverter means;

control means for comparing the output setting value from said output setting means with the current value from said input detecting means and supplying a control signal to said inverter means in accordance with a comparison result, thereby controlling the output from said inverter means and causing said microwave heating means or said induction heating means to generate selectively the first or second heating power, said control means also suppressing the output setting value from said output setting means to be not more than a predetermined value until the current value from said input detecting means exceeds a reference value when the output setting value for obtaining the first heating power is set by said output setting means; and wherein the width between the upper and lower limit values is larger than a minimum control width of level control of a microcomputer used in said control means, the predetermined width of the output setting value preventing variations in the control signal due to a time lag between a change in the current value and a corresponding change in the output setting value.

8. A composite cooking apparatus having a microwave heating function and an induction heating function, said apparatus comprising:
- inverter means for rectifying an AC input to obtain a DC output and switching the DC output so as to selectively obtain a high-frequency output for microwave or induction heating;
- microwave heating means, coupled to said inverter means, for receiving the high-frequency output for microwave heating and generating a first heating power of a microwave;
- induction heating means, coupled to said inverter means, for receiving the high-frequency output for induction heating and generating a second heating power by electromagnetic induction;
- output setting means for setting an output setting value so as to selectively obtain the first or second heating power;
- input detecting means for detecting a current value of the AC input to said inverter means;
- cooking time setting means for setting a desired cooking time; and
- control means for:
  - comparing the output setting value from said output setting means with the current value from said input detecting means and supplying a control signal representing the desired cooking time set by said cooking time setting means to said inverter means in accordance with a comparison result, thereby controlling the output from said inverter means and causing said microwave heating means or said induction heating means to selectively generate the first or second heating power for the desired cooking time,
  - initially setting the desired cooking time set by said cooking time setting means to be a minimum value when the output setting value for obtaining the first heating power is set by said output setting means, and
  - initially setting the desired cooking time set by said cooking time setting means to be a maximum value when the output setting value for obtaining the second heating power is set by said output setting means.

9. An apparatus according to claim 8, wherein said cooking time setting means includes a time setting knob which can be endlessly rotated, and encoder means interlocked with selective rotation of said time setting knob to generate the desired cooking time.

10. An apparatus according to claim 9, wherein said encoder means for changing the desired cooking time sets the desired cooking time to "zero" next to the "maximum value" in induction heating when said time setting knob is rotated in a direction for increasing the cooking time.

11. An apparatus according to claim 10, wherein said time setting knob is arranged in an operation panel, and said operation panel is inclined at a corner of a composite cooking system housing.

12. A method of controlling a composite cooking system having microwave and induction heating functions, comprising the steps of:
- initially setting a cooking time to be "zero" in microwave heating;
- initially setting the cooking time to be a "maximum value" in induction heating; and
- changing the cooking time upon operation of a time setting knob which can be endlessly rotated.

13. A method of controlling a composite cooking system having an inverter for rectifying an AC input to obtain a DC output end switching the DC output so as to selectively obtain a high-frequency output for microwave or induction heating, a microwave heater, coupled to the inverter, for receiving the high-frequency output for microwave heating and generating a first heating power, an induction heater coupled to the inverter for receiving the high-frequency output for induction heating and generating a second heating power by electromagnetic induction, the method comprising the steps of:
- setting an output setting value so as to selectively obtain the first or second heating power;
- detecting a current value of the AC input to the inverter;
- comparing the output setting value with the current value;
- supplying a control signal to the inverter in accordance with a comparison result of the comparing step, to thereby control the output from the inverter and cause the microwave heater or the induction heater to selectively generate the first or second heating power;
- setting a load detection setting value when the output setting value for obtaining the second heating power is set;
- comparing the load detection setting value with the current value;
- determining whether the load of the induction heating means is proper in accordance with a comparison result; and
- supplying an operation interruption signal to the inverter when the determination result represents that the load is improper.

14. A method of controlling a composite cooking system having an inverter for rectifying an AC input to obtain a DC output and switching the DC output so as to obtain selectively a high-frequency output for microwave or induction heating, a microwave heater, coupled to the inverter, for receiving the high-frequency output for microwave heating and generating a first heating power, an induction heater coupled to the inverter for receiving the high-frequency output for induction heating and generating a second heating power by electromagnetic induction, the method comprising the steps of:
- setting an output setting value so as to obtain selectively the first or second heating power, the output setting value including upper and lower limit values having a predetermined width;
- detecting a current value of the AC input to the inverter;
- comparing the output setting value with the current value;
- supplying a control signal to the inverter in accordance with a comparison result of the comparing step, to control thereby the output from the inverter and cause the microwave heater or the induction heater to generate selectively the first or second heating power, the control signal having a minimum control width smaller than the predetermined width of the upper and lower limit values, the comparison result being independent of a time lag between a change in the current value and a corresponding change in the output setting value.

15. A method of controlling a composite cooking system having an inverter for rectifying an AC input to obtain a DC output and switching the DC output so as to obtain selectively a high-frequency output for microwave or induction heating, a microwave heater, coupled to the inverter, for receiving the high-frequency output for microwave heating and generating a first heating power, an induction heater coupled to the inverter for receiving the high-frequency output for induction heating and generating a second heating power by electromagnetic induction, the method comprising the steps of:

setting an output setting value so as to obtain selectively the first or second heating power, the output setting value including upper and lower limit values having a predetermined width;

detecting a current value of the AC input to the inverter;

comparing the output setting value with the current value;

supplying a control signal to the inverter in accordance with a comparison result of the comparing step, to control thereby the output from the inverter and cause the microwave heater or the induction heater to generate selectively the first or second heating power, the control signal having a minimum control width smaller than the predetermined width of the upper and lower limit values, the comparison result being independent of a time lag between a change in the current value and a corresponding change in the output setting value; and suppressing the output setting value to be not more than a predetermined value until the current value exceeds a reference value when the output setting value for obtaining the first heating power is set.

16. A method according to claim 15, wherein the output setting signal is level-controlled to be a predetermined output in accordance with the detection current when the detection current exceeds the reference value.

* * * * *